Aug. 23, 1955  S. D. KRETZER  2,716,148
GROUND STAKES FOR ELECTRICAL CONDUCTING CABLES
Filed Feb. 21, 1951

INVENTOR:
SIDNEY D. KRETZER,
BY Kingsland, Rogers & Ezell
ATTORNEYS

United States Patent Office 2,716,148
Patented Aug. 23, 1955

2,716,148

GROUND STAKES FOR ELECTRICAL CONDUCTING CABLES

Sidney D. Kretzer, St. Louis, Mo.

Application February 21, 1951, Serial No. 211,999

1 Claim. (Cl. 174—7)

This invention relates to ground stakes for electrical conducting cables, particularly for lightning rod systems.

In the installation of a system of lightning rods for the protection of buildings, it is important that the terminals be efficiently grounded. Practical standards of permissible electrical resistance in such systems have been developed and require that the electrical resistance of a satisfactory protective lightning rod system shall be within definite limits. For example, when tested, the electrical resistance should ordinarily not exceed 5 ohms under usual standards. It is important, therefore, that the terminals be as efficiently grounded as possible to hold the electrical resistance within standard limits.

The character of the earth formation into which the ground stakes are driven and the extent of surface contact between such ground terminals are important because they influence the over-all degree of electrical resistance of the system.

The ground members are usually in the form of a driven stake which is electrically connected with the terminal of the cables of the lightning rod system. These stakes usually are driven to a considerable depth, for example, about ten feet for the average installation. The depth to which the stakes are driven may, however, vary with the character of the earth formation and other conditions. As a practical matter, it is important to provide a maximum contacting surface between the ground member and the earth into which it is driven and to reduce the length of the ground stake as far as practical, and still have the necessary surface contact.

It is one of the primary objects, therefore, of the present invention to provide a ground stake that may be driven to a practical depth and, at the same time, to provide a contact surface that would be adequate for grounding the system without excessive over-all electrical resistance in the system.

Another object of the invention is to provide a ground stake for the purposes mentioned which may be easily driven and which will remain set in contact with the ground in which it is embedded and in close contact therewith.

Other advantages of the invention will appear from the following description taken in connection with the accompanying drawing, in which.

In the embodiment of the invention selected for illustration, the body of the stake 10 is in the form of a metallic rod, rectilinear in cross section. The material of the rod is such that it has a low electrical resistance, for example, copper or brass, but of sufficient tensile strength so that it may be driven to the required depth into the ground.

The lower end of the stake is pointed as indicated at 11 to facilitate the driving thereof into the ground at selected locations.

Figure 1:
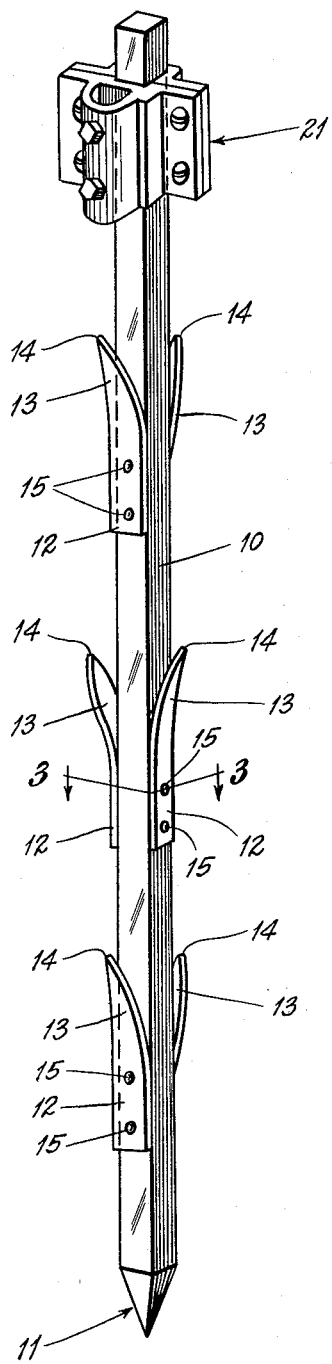
Fig. 1 is an isometric view of the ground stake embodying the invention, illustrating a cable connector mounted thereon.
Figure 2:
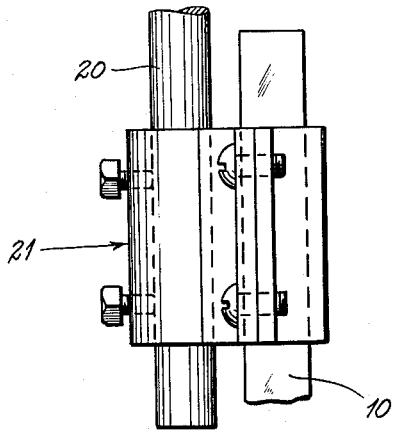
Fig. 2 is an enlarged view of the connector element for connecting the electrical conducting cable with the ground stake.
Figure 3:
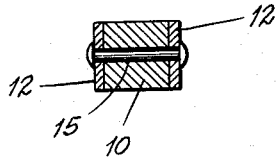
Fig. 3 is an enlarged cross section on the line 3—3 of Fig. 1.

A series of wing members 12 in the form of specially formed lugs are mounted at spaced intervals on the opposite faces of the member 10. These wing members are arranged in a vertical spaced series which are preferably circumferentially staggered, that is, alternate pairs of the vertical series are on different opposite faces of the member 10 as clearly illustrated in Fig. 1. The wing members each comprise a plate the lower portion of which is rectangular in form and is dimensioned to fit flat against the face of the member 10. The base of the member is extended upwardly and outwardly, forming a portion 13, the side edges of which converge to form a sharp terminal point as indicated at 14.

The members 12 are securely attached to the rod member 10 in such a manner as to provide for an effective electrical connection between them and the rod. Any suitable means of attachment may be employed, but, as illustrated, the attaching means includes rivets 15 that pass from side to side of the rod member 10 and serve to hold the wing members in close contact with the metal surfaces of said rod.

The terminal of the cable 20 is attached to the upper end of the member 10 by any suitable form of connector as indicated at 21.

In the installation of a lightning rod system, the ground stake is driven to the required depth, it being understood that each terminal cable of the system is to be grounded. The shape and arrangement of the rod and the attached wings, as illustrated, permit the stake of the present invention to be driven with substantially no more energy than a stake having a plain surface.

After the stake is driven to the appropriate depth, it is slightly elevated, which movement spreads the wings outwardly and causes them to make close contact with the surface of the earth in which they are embedded. It will be observed, therefore, that for a stake of a given longitudinal dimension, the wings provide an increase of surface contacting the earth, since the total contact surface includes not only the rod surface, but the combined surface of the wings embedded by close contact with the adjacent surfaces of the earth.

After the stake has been set in the manner described, it will be securely embedded in place so that it cannot be moved easily to break the close contact with the surface in which it is embedded.

From the foregoing description, it will be apparent that the structure as illustrated efficiently accomplishes the purposes as hereinbefore stated. It will be understood, however, that the shape and arrangement of the parts may be varied within equivalent limits without detracting from the accomplishment of its primary objectives.

What is claimed is:

A stake for electrically grounding cables comprising an elongated solid metallic rod of uniform cross section and pointed at its lower end, said rod having a multiple series of vertically spaced outwardly and upwardly extending pointed wing members immovably attached at the bottom of said wing members to the sides of said rod along the major portion of the width and length of said rod in electrical conducting relationship, each of said series consisting of two wing members on opposed sides of said rod, and the adjacent series being staggered from one another, both said rod and wing members being made of a material having a low electrical resistance, and means for attaching an electrical conducting cable to the upper part of said rod, said means including a cable receiving clamp, said clamp being slidably received in electrical conducting relationship on and removable from the top end of said rod, at least part of said material being constructed of a number of the group consisting of copper and brass.

References Cited in the file of this patent

UNITED STATES PATENTS

| | | |
|---|---|---|
| 742,279 | Bearse | Oct. 27, 1903 |
| 1,153,450 | Schaff | Sept. 14, 1915 |
| 2,366,997 | Brand | Jan. 9, 1945 |

FOREIGN PATENTS

| | | |
|---|---|---|
| 226,869 | Great Britain | Dec. 29, 1924 |
| 101,789 | Australia | Aug. 19, 1937 |